United States Patent
Sanders et al.

(10) Patent No.: US 11,899,559 B1
(45) Date of Patent: *Feb. 13, 2024

(54) POLICY CONTROL THREAT DETECTION

(71) Applicant: Wells Fargo Bank, N.A., San Francisco, CA (US)

(72) Inventors: Adam Sanders, Huntersville, NC (US); Keith Travis Witt, Chesterfield, VA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/493,219

(22) Filed: Oct. 4, 2021

Related U.S. Application Data

(63) Continuation of application No. 17/108,744, filed on Dec. 1, 2020, now Pat. No. 11,140,061.

(51) Int. Cl.
 *G06F 11/36* (2006.01)
 *G06F 8/41* (2018.01)

(52) U.S. Cl.
 CPC ............ *G06F 11/3604* (2013.01); *G06F 8/43* (2013.01)

(58) Field of Classification Search
 CPC .................................................. G06F 11/3604
 See application file for complete search history.

(56) References Cited

U.S. PATENT DOCUMENTS

| | | |
|---|---|---|
| 9,894,045 B1 | 2/2018 | Mao |
| 10,095,602 B2 | 10/2018 | Gautam et al. |
| 10,262,156 B1 | 4/2019 | Sanders et al. |
| 10,423,410 B1 | 9/2019 | Goyal et al. |
| 10,587,632 B1 | 3/2020 | Perumalla et al. |
| 10,652,266 B1 | 5/2020 | Tautschnig et al. |
| 11,140,061 B1 | 10/2021 | Sanders et al. |

(Continued)

FOREIGN PATENT DOCUMENTS

WO 2019070630 A1 4/2019

OTHER PUBLICATIONS

Mohammed Nasser Al-Mihiqani et al., "A Review of Insider Threat Detection: Classification, Machine Learning Techniques, Datasets, Open Challenges, and Recommendations," 2020 [retrieved on Sep. 28, 2023], Appl.Sci.2020, 10,5208, pp. 1-41, downloaded from <url>:https://www.mdpi.com. (Year: 2020).*

(Continued)

*Primary Examiner* — S. Sough
*Assistant Examiner* — Stephen D Berman
(74) *Attorney, Agent, or Firm* — Shumaker & Sieffert, P.A.

(57) ABSTRACT

Techniques are described that determine whether applications and/or services operating in a network environment adhere to risk reduction policies. An example system includes one or more processors, a first agent, a second agent, a third agent, and a compliance analyzer. The first agent analyzes source code in a source code repository associated with an application executing in a network environment according to a first set of policies. The second agent analyzes artifacts of deployed assets on a target deployment environment associated with the application according to a second set of policies. The third agent analyzes access logs to the application according to a third set of policies. The compliance analyzer determines a risk of the application based on the analysis by the first, second, and third agents.

20 Claims, 5 Drawing Sheets

(56) References Cited

U.S. PATENT DOCUMENTS

| | | |
|---|---|---|
| 2013/0097660 A1 | 4/2013 | Das et al. |
| 2014/0337972 A1 | 11/2014 | Foster et al. |
| 2017/0302685 A1 | 10/2017 | Ladnai et al. |
| 2019/0318366 A1 | 10/2019 | Carranza et al. |
| 2020/0204463 A1 | 6/2020 | Guan et al. |
| 2020/0293970 A1* | 9/2020 | Hwang .............. G06Q 10/0635 |
| 2021/0067527 A1* | 3/2021 | Chen ......................... G06N 3/08 |
| 2021/0357206 A1* | 11/2021 | Karve ................. G06F 11/3612 |

OTHER PUBLICATIONS

Sonnekalb, "Machine-Learning Supported Vulnerability Detection in Source Code", ESEC/FSE 2019: Proceedings of the 2019 27th ACM Joint Meeting on European Software Engineering Conference and Symposium on the Foundations of Software Engineering, Aug. 26-30, 2019, pp. 1180-1183.

Smit et al., "Code Convention Adherence in Evolving Software", 2011 27th IEEE International Conference on Software Maintenance (ICSM), 4 pp.

U.S. Appl. No. 17/092,057, filed Nov. 6, 2020, by Sanders.

Prosecution History from U.S. Appl. No. 17/108,744, dated Feb. 4, 2021 through Jun. 9, 2021, 40 pp.

\* cited by examiner

POLICY CONTROL THREAT DETECTION

This application is a continuation of U.S. patent application Ser. No. 17/108,744, filed 1 Dec. 2020, the entire contents of which is incorporated herein by reference.

TECHNICAL FIELD

This disclosure relates to policy control of network applications.

BACKGROUND

Applications and services are often available on a network to be accessed by users having accounts within the network. Companies and other entities that use and provide these applications and services create policies to govern creation, deployments, and/or access to these applications and services to reduce a likelihood that the applications and services are not used in an unintended manner. For example, an entity may create access control policies that govern access to applications and services. An access control policy may dictate valid source code, asset deployment artifacts, runtime configurations, and/or accesses to the applications and/or the services to ensure that access is limited to user accounts with certain characteristics.

SUMMARY

This disclosure describes techniques to determine whether applications and/or services operating in a network environment adhere to risk reduction policies. Software development and deployment often consists of developing code that is placed is a code repository, building assets from the code and deploying the assets on a target deployment environment, and then, based on the built and deployed assets, operating applications and/or services in a network environment. For each of these phases of the development cycle, policies are created to reduce risk when the applications and/or services are operating in the network environment. For example, policies may be created that govern access to the applications and/or services. An access control policy may dictate valid source code, asset deployment artifacts, runtime configurations, and/or accesses to the applications and/or services operating in the network environment to ensure access control at each phase of the development cycle.

A compliance server includes one or more compliance agents that analyze applications and/or services at various phases of their development cycle to determine whether the applications and/or services are compliant to policies. The compliance server provides a comprehensive analysis of applications and/or services operating on the network. In some examples, the compliance agents analyze applications and/or services at various phases of their development cycle to determine whether the applications and/or services are compliant to access control policies. Each of the compliance agents may include a model generated by a machine learning algorithm to detect patterns that are indicative of non-compliance to policies.

The compliance server may include a source code agent, an asset agent, and/or a runtime agent. The code agent may analyze new and/or updated source code that is placed in a code repository to determine whether the code complies with applicable policies. For example, the code agent may determine compliance to policies that require source code to use external security to an approved enterprise access control system. The asset agent may analyze artifacts (e.g., access logs and permissions records, and related metadata such as timestamps, checksums, and binary signatures) of deployed software assets on a target deployment environment to determine whether the artifacts indicate compliance to applicable policies. For example, the asset agent may analyze permission settings and historical access logs to determine compliance to policies that require privileged-based access to deployed software assets. The runtime agent may analyze runtime logs or access request logs to determine whether access and use of the applications and/or services operating in the network environment are compliant with applicable policies. For example, the runtime agent may analyze access characteristics (e.g., location, job title, training certifications, etc.) to determine whether actual access to the applications and/or services comply with "least privilege" access policies.

A compliance analyzer receives reports from the compliance agents and determines whether an application or service is compliant with applicable policies. In some examples, the compliance analyzer determines a compliance score for each application or service that is indicative of a risk associated with the application or service. The compliance score may change as associated source code is updated, the deployed software assets are accessed, and the application or service is used. This allows determining compliance of an application and server. Additionally, by monitoring and scoring an application based on multiple points during its development cycle, undetected risks introduced in one part of development may be detected in later part of development to provide holistic risk assessment. In some examples, a compliance score output by the compliance analyzer for a particular application or service may be combined with an independent, manual review of the particular application or service to complement and assist with the review.

An example system includes one or more processors, a first agent, a second agent, a third agent, and a compliance analyzer. The first agent analyzes source code in a source code repository associated with an application executing in a network environment according to a first set of policies. The second agent analyzes artifacts of deployed assets on a target deployment environment associated with the application according to a second set of policies. The third agent analyzes access logs to the application according to a third set of policies. The compliance analyzer determines a risk of the application based on the analysis by the first, second, and third agents.

An example method includes analyzing, by a first agent, source code in a source code repository associated with an application executing in a network environment according to a first set of policies. The method also includes analyzing, by a second agent, artifacts of deployed assets on a target deployment environment associated with the application according to a second set of policies. Additionally, the method includes analyzing, by a third agent, access logs to the application according to a third set of policies. The method includes determining, by a compliance analyzer, a risk of the application based on the analysis by the first, second, and third agents.

An example computer readable medium comprises instructions that, when executed, cause one or more processors to analyze, by a first agent, source code in a source code repository associated with an application executing in a network environment according to a first set of policies. The instructions also cause the one or more processors to analyze, by a second agent, artifacts of deployed assets on a target deployment environment associated with the application according to a second set of policies. Additionally, the instructions cause the one or more processors to analyze, by a third agent, access logs to the application according to a third set of policies. Further, the instructions cause the one or more processors to determine, by a compliance analyzer, a risk of the application based on the analysis by the first, second, and third agents.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
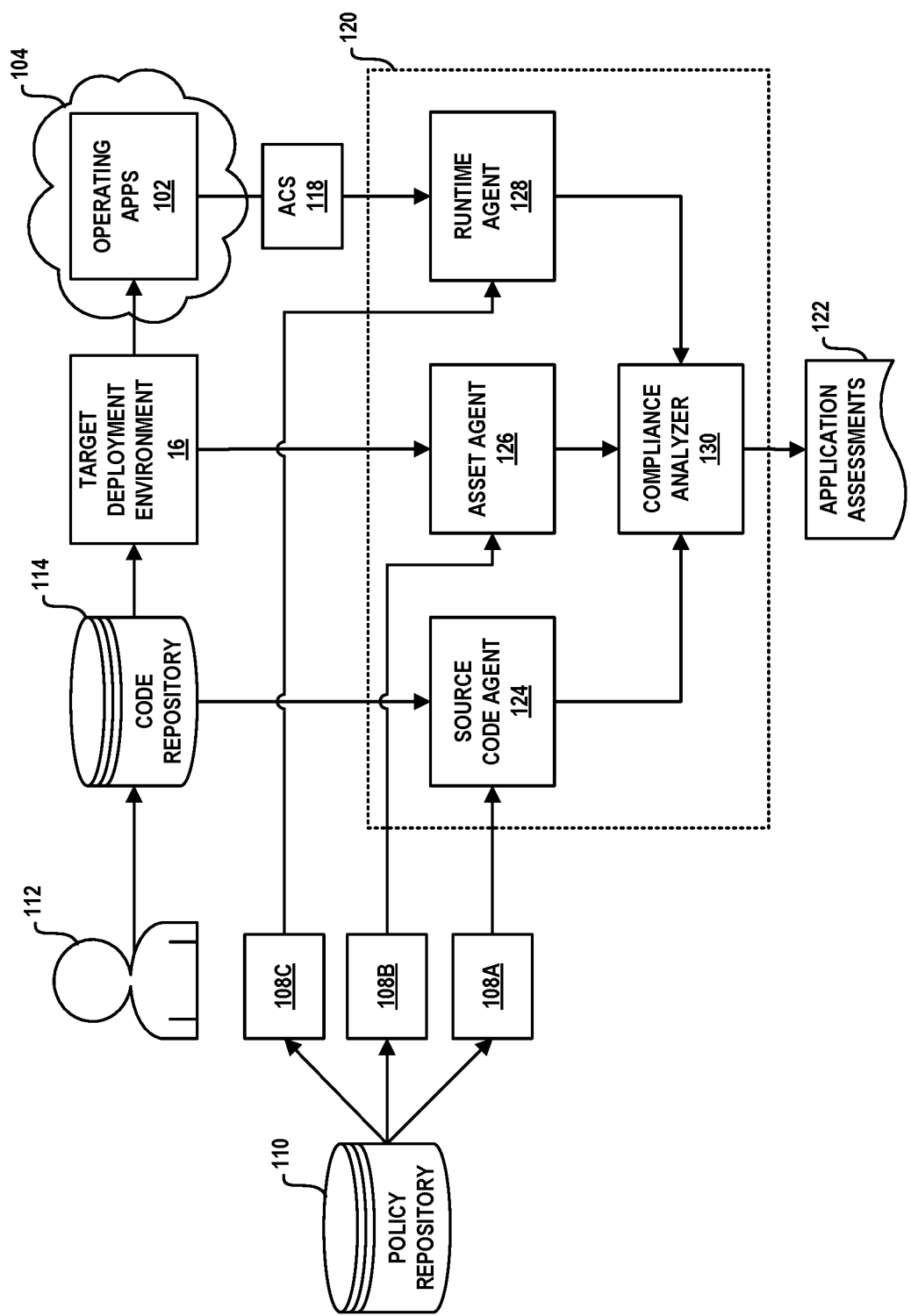
FIG. 1 illustrates an example system including a compliance server configured to perform an automated policy compliance determination, in accordance with the teachings of this disclosure.

FIG. 1 illustrates a system including a compliance server 120 configured to perform an automated policy compliance determination, in accordance with the teachings of this disclosure. An entity (e.g., a financial institution, a corporation, etc.) develops policies to ensure that applications and/or services (collectively "applications") 102 operating in a network environment 104 conform to developments and user standards. Examples below use access control policies. However, any type of policy may be used, such as software architecture design (e.g., dependency injection, design patterns, and/or N-Tier architecture, etc.), and/or privacy controls, etc.

Policies 108A, 108B, and 108C (collectively "policies 108") are generated from policy statements and deposited into a policy repository 110. Policy statements define actions and/or characteristics that either are to be implemented (sometimes referred to as "positive policy statements") or to be avoided (sometimes referred to as "negative policy statements") in source code, in artifacts of deployed software assets, and/or in access to resulting applications 102. These policy statements may be based on, for example, regulatory requirements, industry best practices, company best practices, and/or software development best practices, etc. In some examples, policy statements are developed using natural language. Policies 108 are generated from the policy statements (e.g., by policy domain experts, etc.) to be verifiable criteria (e.g., quantifiable criteria with objective evaluators that measure compliance with the applicable policy statement, etc.) that can be used to train (e.g., via machine learning) agents to detect source code and/or patterns of access that violate the policy statements.

In the illustrated example of FIG. 1, developers 112 write source code that eventually will become part of at least one of applications 102 operating in network environment 104. The source code is deposited into a code repository 114. Code repository 114 stores the latest version of the source code and metadata related to changes to any stored source code, such as an identifier of which of developers 112 created and/or modified the source code, date of creation/modification, and/or location of creation/modification, etc. One or more policies 108A are directed to source code stored in code repository 114, including policies 108A relating to content of the source code (e.g., does the source code externalize authorization requests to an approved enterprise access control system, etc.) and/or policies 108A relating to the metadata (e.g., do the persons creating and/or modifying a particular source code have characteristics of developers 112 that are authorized to create or modify that particular source code, etc.).

Source code in code repository 114 is compiled into assets for applications 102 that are deployed on a target deployment environment 116. Target deployment environment 116 may be hosted in a cloud environment, a single server, multiple servers, file shares, etc. The assets deployed on target deployment environment 116 may include application binaries, runtime configuration files, dynamic link libraries (DLLs), executables, dynamic or static libraries, and/or other resource files or data. Target deployment environment 116 may also include artifacts of the deployed asset such as access logs and permissions records, and related metadata such as timestamps, checksums, and binary signatures. For example, the deployed asset may comprise an application object for a particular one of applications 102 and the artifact of the deployed asset may comprise metadata relating to the application object, such as an identifier of which of developers 112 created and/or modified the source code, date of creation/modification, and/or location of creation/modification, etc. Access to the application object deployed on target deployment environment 116 may be controlled by a permission scheme. One or more policies 108B are directed to the deployed assets on target deployment environment 116, including policies 108B relating to the artifacts of the deployed assets (e.g., access logs and permissions records, and related metadata such as timestamps, checksums, and binary signatures). As one example, policies 108B may relate to metadata associated with access logs to the deployed assets (e.g., do the persons accessing a particular application object have characteristics of persons that are authorized to access the particular application object, etc.).

Applications 102 use deployed assets on target deployment environment 116. Users request access to applications 102 via an access control system ("ACS") 118. Example access control systems are described in U.S. Pat. No. 10,262,156, entitled "Real-Time Feature Level Software Security," issued Apr. 16, 2019, and in U.S. patent application Ser. No. 17/092,057, entitled "Access Control Threat Detection," filed Nov. 6, 2020, the contents of each of which are incorporated by reference in their entirety. One or more policies 108C are directed towards access to applications 102. When a user requests access, access control system (ACS) 118 collects characteristics of the user (e.g., demographic data, employment data, training certificates, network characteristics, computing device characteristics, geographic location, and/or priority, etc.) to determine whether to grant access to applications 102 to the user. Access control system 118 may also track chronological data, such as login time, access duration, and/or frequency of access, etc. (collectively with characteristics of the user are sometimes referred to as "access metadata"). Policies 108C may relate to the access metadata to ensure that only authorized individuals are able to access applications 102 in accordance with the principles of least privileged access. In some examples, violations of policies 108C may be used to infer improper access to deployed assets target deployment environment 116 and/or improper coding of source code in code repository 114.

A compliance server 120 receives and/or otherwise retrieves policies 108, source code from code repository 114 (e.g., when source code is added/updated in code repository 114, etc.), artifacts, e.g., access logs and permission records and related metadata, of deployed assets on target deployment environment 116, and access requests and access metadata from access control server 118, and generates application assessments 122. Application assessments 122 assign a confidence value (sometime referred to as a "risk value") to applications 102. An assessment of an application includes evaluations of source code in code repository 114 and artifacts of deployed assets on target deployment environment 116 used by the application to provide a comprehensive evaluation of the application. Application assessments 122 facilitate demonstrating compliance with policy statements and/or providing a prioritization of applications 102 to service for policy compliance. For example, network environment 104 may include thousands of applications that need to periodically be audited and, in some percentage of cases, modified to address policy compliance issues (e.g., in response to new source code, in response to updated policy statements, etc.). Assessments 122 facilitate creating a ranked list of applications 102 to be investigated and remediated. Policies 108 may be weighted and/or scored such that compliance to one policy statement may be worth more in assessments 122 than compliance with another policy statement.

To generate assessments 122, compliance server 120 includes a source code agent 124, an asset agent 126, a runtime agent 128, and a compliance analyzer 130. Compliance server 120 and/or any other suitable computing system may be configured to train agents 124, 126, 128 using a supervised machine learning algorithm. The machine learning algorithm may be, for example, a deep learning model, such as a convolutional neural network (CNN) or a recurrent neural network (RNN). As described below, agents 124, 126, 128 are trained with different training sets of labeled pairs that the deep learning model uses to identify a plurality of patterns in a plurality of sequences of events. That is, the deep learning model may observe patterns and/or sequences of events known to violate the applicable set of policies 108. Agents 124, 126, 128 may accept a sequence of events as an input and produce a determination (e.g., which, if any, policies 108 were violated, etc.) as an output.

Source code agent 124 includes one or more machine learning generated models trained with labeled pairs comprising policies 108A and examples of compliance and non-compliance to policies 108A. To generate the model(s), compliance server 120 may use labeled pairs that include examples of live code statements representing known valid implementation of policies 108A to train a neural network to recognize the existence of those patterns in source code files. For example, a labeled pair may be generated for a policy relating to checking for an Active Directory® group in C# matching the entity's Active Directory naming convention. Compliance server 120 may use labeled pairs that include examples of live code statements representing known examples of actively circumventing a policy to train the neural network. For example, a labeled pair may be generated for a policy relating to looking for 'if' statements in C# that are looking for equality to a static identifier (ID) instead of being externalized to an approved enterprise access control system. For the source code in code repository 114, source code agent 124 generates reports that evaluate compliance to policies 108A. For example, source code agent 124 may evaluate source code when it is added to code repository 114 and, in some examples, reject the addition based on the evaluation report by source code agent 124. The model(s) produce a list of policies 108A that the analyzed source code does and does not properly implement. Using the model(s), source code agent 124 analyzes source code that is deposited and/or updated in source code repository 114 to determine its compliance to policies 108A. The list produced by source code agent 124 is associated with the source code analyzed.

Asset agent 126 includes one or more machine learning generated models trained with labeled pairs comprising policies 108B and examples of compliance and non-compliance to policies 108B. To generate the model(s), compliance server 120 may use labeled pairs that include artifacts (e.g., access logs and permission records, and associated metadata such as timestamps, checksums, and binary signatures) of deployed assets representing known valid implementation of policies 108B to train a neural network to recognize the existence of patterns that show compliant artifacts of deployed assets. For example, the labeled pairs may include access logs from target deployment environment 116 that show usernames that match standards associated with privileged identifiers as listed on a privileged account list. Compliance server 120 may use labeled pairs that include artifacts of deployed assets representing known violations of policies 108B to train a neural network to recognize the existence of patterns that show non-compliant artifacts of deployed assets. For example, the labeled pairs may include access logs from target deployment environment 116 that show developers deploying directly to production shares not associated with privileged accounts. As another example, the labeled pairs may include access logs from target deployment environment 116 that show improper or suspicious access by privileged accounts. The model(s) produce a list of policies 108B that the analyzed source code does and does not properly implement. Using the model(s), asset agent 126 analyzes artifacts of deployed assets on target deployment environment 116 to determine whether a given artifact of the deployed assets is indicative of compliance to policies 108B. For example, when a user accesses a deployed asset on target deployment environment 116, the asset agent 126 may analyze metadata associated with that instance of accessing the deployed asset to determine it is consistent with policies 108B. The list produced by asset agent 124 is associated with the deployed assets analyzed.

Runtime agent 128 includes one or more machine learning generated models trained with labeled pairs comprising policies 108C and examples of compliance and non-compliance to policies 108C. To generate the model(s), compliance server 120 may use labeled pairs that include request logs and associated metadata representing known valid implementation of policies 108C to train a neural network to recognize the existence of patterns that show properly maintained access control. For example, the labeled pairs may include access logs from access control system 118 that exhibit compliance with one of policies 108C and access logs from access control system 118 that exhibit non-compliance with the same one of policies 108C. For example, the labeled pairs may include users and associated access metadata (e.g., job-title, location, etc.) and operations performed by applications 102 that show proper or improper access control. An example labeled pair to illustrate improper implementation may include access metadata that is associated with an operation performed by an application, where the access metadata is not sufficient or appropriate for the application to perform the operation. The model(s) produce a list of policies 108C that the analyzed source code does and does not properly implement. Using the model(s), runtime agent 128 analyzes instances of access to applications 102 and operations performed by those applications 102 to determine whether access control of applications 102 is indicative of compliance to policies 108C. The list produced by runtime agent 128 is associated with applications 102 that are accessed.

Compliance analyzer 130 receives lists from source code agent 124, asset agent 126, and runtime agent 128 and compiles application assessments 122 for each application 102. Compliance analyzer 130 associates an application with its deployed assets in target deployment environment 116 and its source code in code repository 114. Based on the policies 108 that are implemented or not implemented as indicated by the lists associated with the application, compliance analyzer 130 generates an associated application assessment with the lists of policies to which the application is likely compliant and/or non-compliant, and a weighted confidence score representing the likelihood that the application represents a risk to access control, where polices 108 are all associated with a weight based on how severe of consequences related to a violation of the policy (e.g., a low weight for violations that cause the network to use more resources, a high weight for violations that may allow a malicious actor to access resources, etc.). In some examples, compliance analyzer 130 maintains a ranked list of all applications 102 operating in network environment 104 based on the weighted confidence score. The ranked list may provide, for example, a priority for implementing and/or ameliorating issues related to access control discovered by agents 124, 126, and 128. Because agents 124, 126, and 128 may run in real time or periodically (e.g., hourly, daily, weekly, etc.), as changes are made to address identified issues, compliance analyzer 130 may update the associated application assessments 122 and the ranked list.

Compliance analyzer 130 outputs at least a portion of the ranked list and/or the individual assessments (e.g., confidence values, etc.) of applications 102. In some examples, when a confidence value for one of applications 102 is less than a threshold value, compliance analyzer 130 generates an alert for the application. In some such examples, compliance server 120 may take action in response to the alert, such as (i) limiting or preventing access to the application (ii) quarantining the application from access to critical services in network environment 104, and/or (iii) reducing functionality of the application. Thus, the compliance analyzer 130 provides a technical benefit to solve the technical problem of tracking and identifying access control issues across a large number of applications 102 operating in network environment 104.

In some examples, compliance analyzer 130 may output all or a portion of the ranked list and/or the individual assessments of applications 102 to one or more computing devices supporting an independent, manual review process for applications 102. The output of compliance analyzer 130 may be used by human agents to complement and assist with the manual review of applications 102. In further examples, compliance analyzer 130 may output an alert for one of applications 102 to the computing devices supporting the manual review process, and one or more of the human agents may take action in response to the alert. This example use case is described in more detail with respect to FIG. 5.

Figure 2:
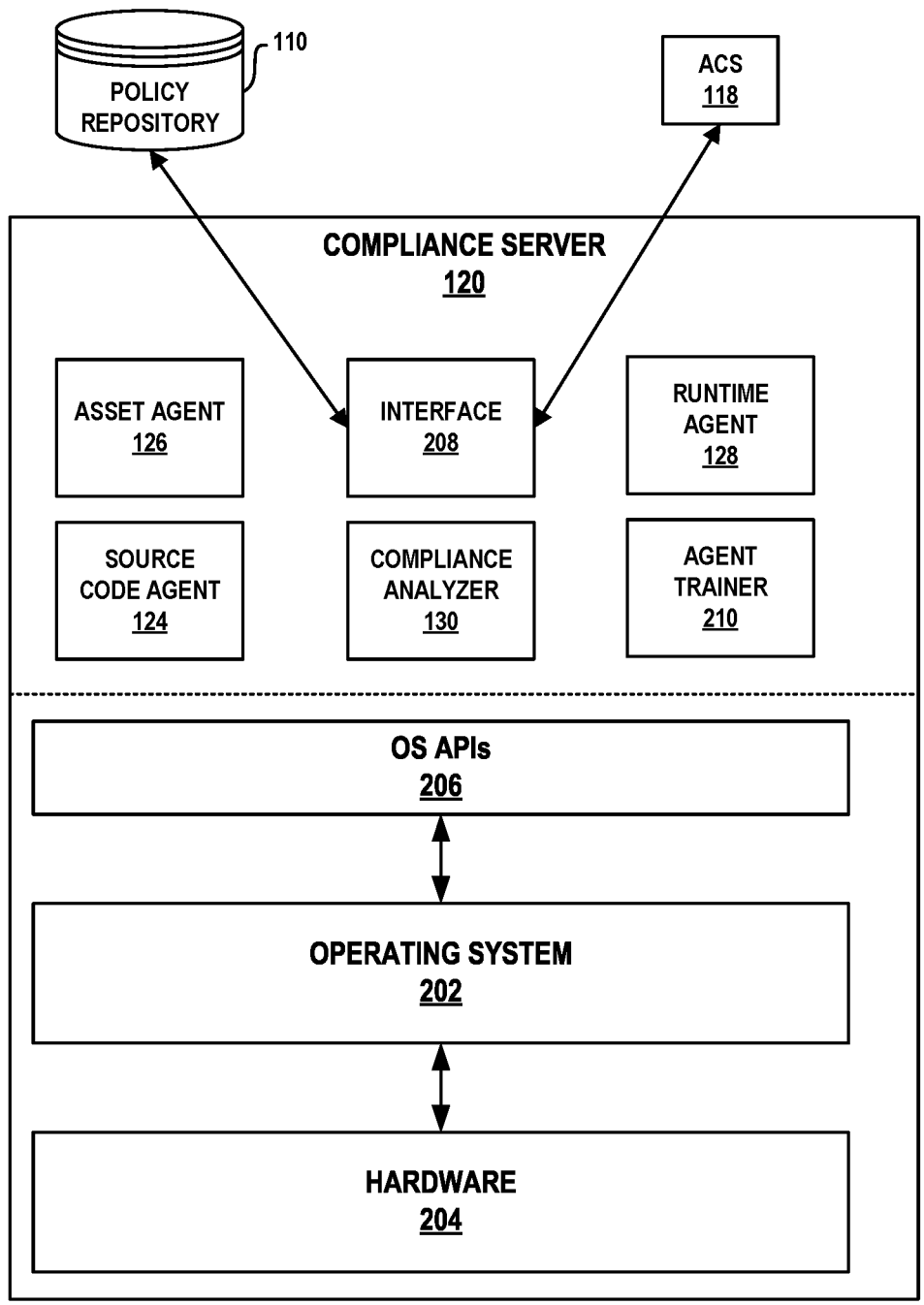
FIG. 2 is a block diagram of an example compliance server of FIG. 1.

FIG. 2 is a block diagram of the compliance server 120 of FIG. 1 operating in accordance with the teachings of this disclosure. In the illustrated example, the compliance server 120 includes operating system 202 for controlling device hardware resources 204 (e.g., processor(s), memory, network interfaces, etc.) and managing various system level operations, operating system APIs 206 used as interfaces between the operating system 202, agents 124, 126, 128, and compliance analyzer 130. In the illustrated example, compliance server 120 includes interface 208. Interface 208 communicatively couples ACS 118 with runtime agent 128 and/or policy repository 110 with agent trainer 210. Interface 208 may serve as an Application Programming Interface (API).

Agent trainer 210 uses different training sets of labeled paired so train agents 124, 126, and 128. Agent trainer 210 uses machine learning algorithms to create data-specific models with the specific training set used for each agent based on a type of input (e.g., source code, access logs, employment data, etc.) and determinations for a specific set of policies (e.g., policies 108A, policies 108B, policies 108C, etc.). Agent trainer 210 may include a trainer to train a model or set of models of an agent and a validator to determine if a trained model is sufficiently trained. For each agent 124, 126, 128, agent trainer 210 may generate one or more models to identify patterns associated with policy non-compliance that, for example, create a vulnerability in access control to applications 102. Using a subset of the corresponding training data, agent trainer 210 may validate a generated model and retrain the model when its accuracy does not satisfy a threshold accuracy (e.g., 75% accuracy, 87% accuracy, 95% accuracy, etc.). Agent trainer 210 may periodically (e.g., weekly, monthly, bi-monthly, yearly, etc.) retrain the model(s) associated with each of agent 124, 126, 128 to account for updated policies 108 and/or updated known threats and/or violations of policies.

While the example in FIG. 2 illustrated agents 124, 126, and 128, compliance analyzer 130, and agent trainer 120 operating on the same server (e.g., the compliance server 120), any of agents 124, 126, and 128, compliance analyzer 130, and/or agent trainer may be operated on one or more separate servers. For example, source code agent 124 may operate on a server that also hosts code repository 114, asset agent 126 any operate one or more servers that also host target deployment environment 116, and runtime agent 128 may operate on a server that also hosts ACS 118.

Figure 3:
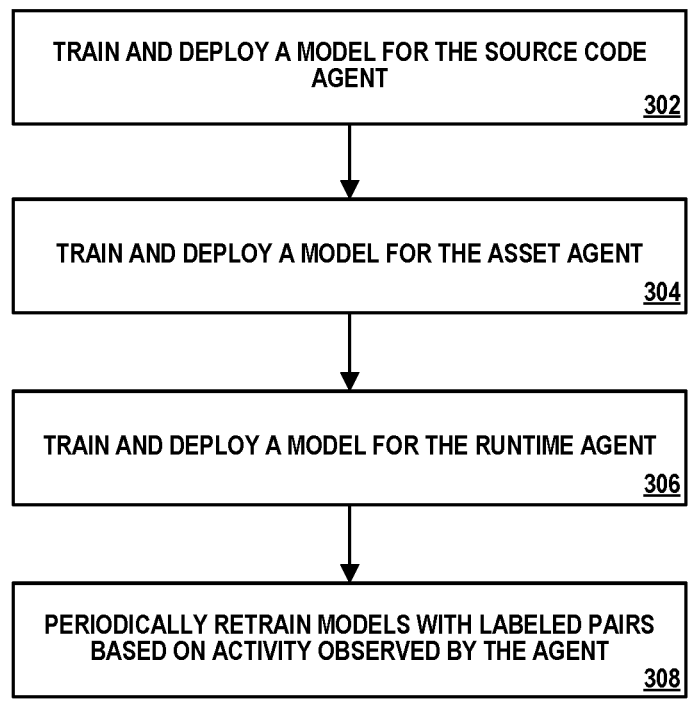
FIG. 3 is a flowchart of an example method of generating models to detect compliance to policies, in accordance with the teachings of this disclosure.

FIG. 3 is a flowchart of an example method of generating models to detect compliance to policies, in accordance with the teachings of this disclosure. Initially, compliance server 120 trains one or more models for source code agent 124 to detect patterns and/or sequences that are indicative of non-compliance to policies 108A (302). The one or more models are deployed to scan source code as it is inserted into source code repository 114 to detect non-compliance. For example, the model(s) may be deployed to detect non-compliance and reject source code when non-compliance is detected. Compliance server 120 trains one or more models for asset agent 126 to detect patterns and/or sequences of artifacts of deployed assets on target deployment environment 116 indicative of non-compliance to policies 108B (304). The one or more models are deployed to periodically (e.g., hourly, daily, weekly, etc.) analyze artifacts such as access logs and/or permissions records or related metadata for deployed assets on target deployment environment 116 in real-time. Compliance server 120 trains one or more models for runtime agent 128 to detect patterns and/or sequences of access and/or requests for access to applications 102 that are indicative of non-compliance to policies 108C (306). The one or more models are deployed to periodically (e.g., hourly, daily, weekly, etc.) and/or in real time analyze requests to applications 102. Compliance server 120 periodically retrains the models associated with each of agents 124, 126, 128 with updated training sets of labeled pairs based on updates to policies 108 and/or activity observed by agents 124, 126, 128 (308).

Figure 4:
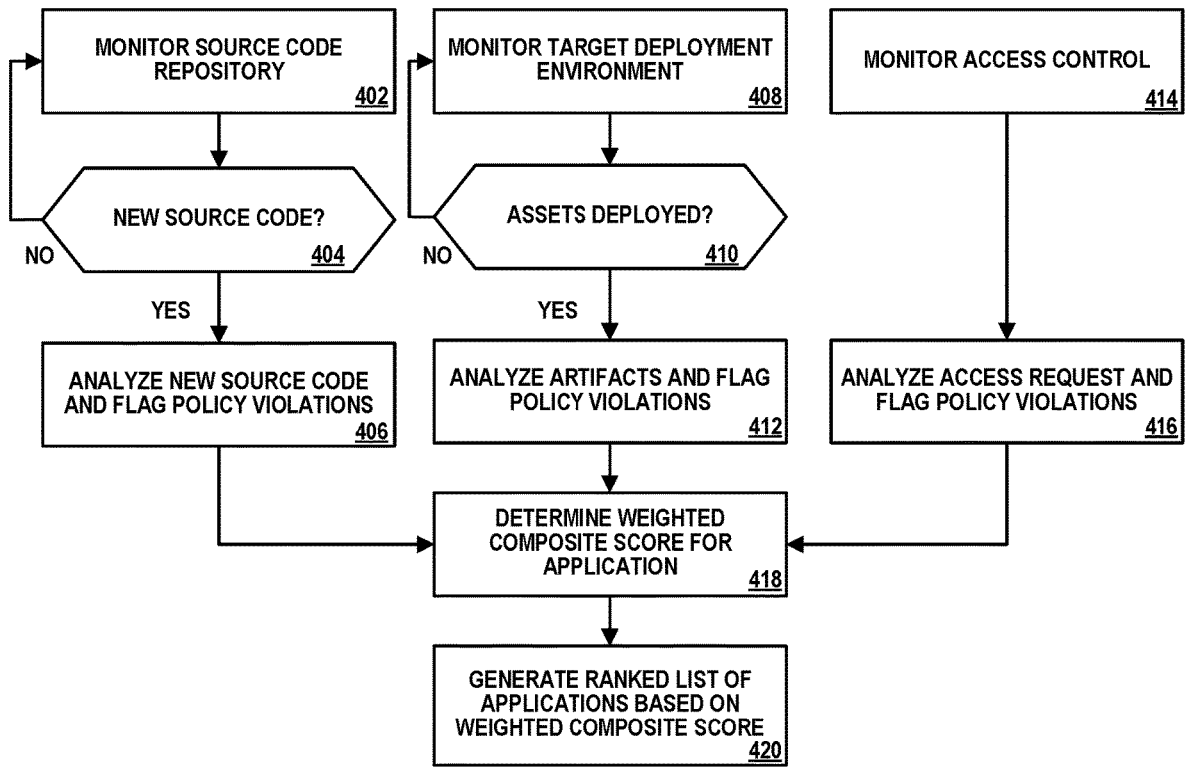
FIG. 4 is a flowchart of an example method of determining compliance with policies of applications and services at various phases of their development cycle, in accordance with the teachings of this disclosure.

FIG. 4 is a flowchart of an example method of determining compliance with policies of applications and services (e.g., applications 102) at various phases of their development cycle, in accordance with the teachings of this disclosure. Source code agent 124 monitors source code repository 114 for new or modified source code being added (402). When new or modified source code is added (YES at block 404), source code agent 124 analyzes the source code and generates a report for any detected violation of policies 108A (406). The report flags the specific violation and, in some examples, provides metadata (e.g., user identifier of person adding the source code, a timestamp, identifier of the computer, etc.) regarding the violation. In some examples, when a violation is detected, source code agent 124 rejects the source code so that it is not added to source code repository 114. Otherwise, when there is not new or modified source code (NO at 404), source code agent 124 continues to monitor source code repository 116 (402).

Asset analyzer 126 periodically or in real-time monitors target deployment environment 116 (408). When application assets (e.g., application binaries, runtime configuration files, dynamic link libraries (DLLs), executables, dynamic or static libraries, and/or other resource files or data) are deployed on target deployment environment 116 (YES at 410), asset analyzer 126 analyzes artifacts of the deployed assets (e.g., access logs and permissions records, and related metadata such as timestamps, checksums, and binary signatures) and generates a report for any detected violation of policies 108B (412). For example, asset analyzer 126 may analyze the access logs every hour, may analyze the access logs in response to someone accessing the deployed assets on the target deployment environment 116, and/or may analyze the access logs when a new asset is deployed on target deployment environment 116. The report flags the specific violation and, in some examples, provides metadata (e.g., user identifier of person accessing the asset, a timestamp, identifier of the computer, etc.) regarding the violation. Otherwise, when the asset has not yet been deployed on target deployment environment 116 (NO at 410), asset analyzer 126 waits and continues to monitor target deployment environment 116 (408).

Runtime agent 128 monitors access requests to access applications 102 operating in network environment 104 (414). In real-time and/or periodically (e.g., hourly, daily, weekly, etc.), runtime agent 128 analyzes access requests and generates a report for any detected violation of policies 108C (416). Specific requests may violate one or more of policies 108C (e.g., determined in real-time by runtime agent 128) based on, for example, attributes of the user or user's computer that is granted access. Additionally, patterns of access may violate one or more policies 108C (e.g., determine by batch analysis of access requests periodically). The report flags the specific violation and, in some examples, provides metadata (e.g., user identifier of person requesting access, a timestamp, identifier of the computer, etc.) regarding the violation.

Compliance analyzer 130 receives and stores the reports from agents 124, 126, 128 and determines a weighted composite score for each of applications 102 (418). To determine the weighted composite score, compliance analyzer 130 determines dependency of source code in the source code repository 114 and deployed assets on target deployment environment 116 to the applications 102. Each policy 108 may have a weight based on severity of a breach of the policy 108. The weighted score is an aggregate value for the application for violations of policies 108 detected by all of agents 124, 126, 128 such that the weighted composite score provides a holistic view of policy compliance across the software development cycle.

Compliance analyzer 130 generates a ranked list of applications 102 based on the weighted composite score (420). This ranked list may be used, for example, to prioritize software development to identify applications that may require further development to improve policy compliance while prioritizing limited software development resources. For example, the ranked list or a portion of the ranked list (e.g., the ten applications with the lowest confidence score, etc.) may be exported to a project management or software development management tool as added development tasks related to violations of policies 108 associated with applications 102. In some examples, compliance analyzer 130 generates an alert when the weighted composite score of one of applications 102 drops below a threshold value set to identify applications 102 that pose a threat to network environment 104. In some such examples, compliance server 120 may take action in response to the alert, such as (i) limiting or preventing access to application 102, (ii) quarantining application 102 from access to critical services in network environment 104, and/or (iii) reducing functionality of application 102.

Figure 5:
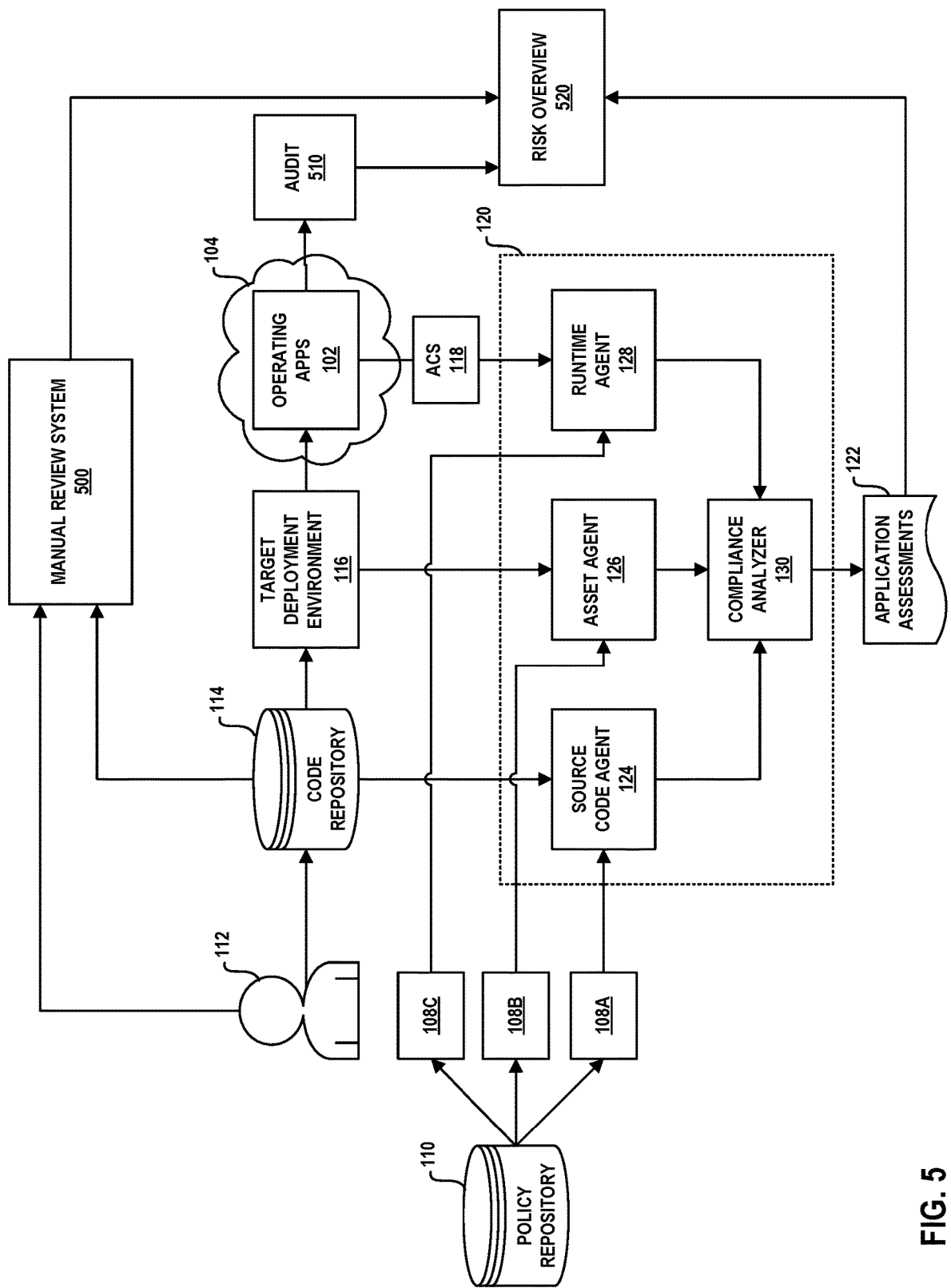
FIG. 5 illustrates an example system in which the automated policy compliance determination by the compliance server of FIG. 1 is combined with a manual review process, in accordance with the teachings of this disclosure.

FIG. 5 illustrates an example system in which the automated policy compliance determination by compliance server 120 of FIG. 1 is combined with a manual review system 500, in accordance with the teachings of this disclosure. The system illustrated in FIG. 5 is substantially similar to the system of FIG. 1, but includes manual review system 500 along with audit unit 510 and risk overview unit 520. In the example of FIG. 5, application assessments 122 output by the compliance analyzer 130 for applications 102 may be combined with the output of manual review system 500 and audit unit 510 to complement and assist with the review process.

Manual review system 500 may include one or more computing devices associated with one or more human agents and configured to support the manual review process. For example, via the associated computing devices, the human agents may peer review source code from source code repository 114, conduct a vulnerability analysis of the source code from source code repository 114, and/or survey developers 112. The results of each of these processes (i.e., peer security reviews, vulnerability reviews, and survey results) may be output to risk overview unit 520. Audit unit 510 may be executed on one or more computing devices that may be separate from manual review system 500. Audit unit 510 may perform automated dynamic analysis of applications 102 operating in network environment 104 and may also perform manual testing of applications 102 operating in network environment 104. In some examples, audit unit 510 may comprise a third party (i.e., not the development team) brought in or hired to perform the audit. The results of each of the automated analysis and the manual analysis may be output to risk overview unit 520.

The manual review process facilitated by manual review system 500 and audit unit 510 may include two approaches to ensuring that applications adhere to security policies. The first approach is self-identification by developers 112 through surveys and annual certifications, in which developers 112 and development managers are asked to certify that their application adheres to the established policies. There are a few challenges to the self-identification approach. First, self-identification requires trust that the developers and/or managers are completing the surveys and certifications in a truthful manner. Second, self-identification requires intimate knowledge of the source code. Given that many applications are very large with hundreds of thousands or even millions of lines of code, it may be difficult if not impossible for the individual completing the survey and/or certification to be familiar with every line of code. The second approach is through security reviews and static analysis of source code. This may be considered an "audit" of the source code to look for specific usage patterns. There are a few challenges to the audit approach as well, particularly if a third party (i.e., not the development team) is performing the audit. Use of a third party may be cost-prohibitive and time consuming, and also requires the third party to come up to speed on an application architecture and structure.

According to the techniques described in this disclosure, the automated policy compliance determination by compliance server 120 may be combined with the manual policy compliance determination by manual review system 500 and audit unit 510 to complement and assist with the review process. In the illustrated example of FIG. 5, compliance analyzer 130 may output application assessments 122, including all or a portion of a ranked list and/or individual assessments of applications 102, to risk overview unit 520. In some examples, compliance analyzer 130 may output an alert for one of applications 102 to risk overview unit 520. The combined results from compliance analyzer 130, each of the manual processes of manual review system 500, and each of the analyses of audit unit 510 may complement each other and assist the human agents with the review of applications 102. For example, risk overview unit 520 may be executed on one or more computing devices and configured to present the combined results from compliance server 120, manual review system 500, and audit unit 510 to one or more human agents for review.

In some such examples, instead of compliance server 120 automatically taking action in response to application assessments 122 alone, risk overview unit 520 and/or human agents associates with risk overview unit 520 may take action in response to the combined results. For example, for a particular one of applications 102, risk overview unit 520 and/or human agents associates with risk overview unit 520 may (i) limit or prevent access to the application (ii) quarantine the application from access to critical services in network environment 104, and/or (iii) reduce functionality of the application.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A system comprising:
one or more processors;
two or more compliance agents executing on the one or more processors, wherein the two or more compliance agents include:
a first compliance agent comprising a first machine learning generated model executing on the one or more processors, wherein the first compliance agent is configured to analyze first components associated with an application at a first phase of a software development cycle for the application as input to the first compliance agent to determine compliance or non-compliance of the first components according to a first set of policies as output from the first compliance agent, wherein the first machine learning generated model is trained based on the first set of policies, and
a second compliance agent comprising a second machine learning generated model executing on the one or more processors, wherein the second compliance agent is configured to analyze second components associated with the application at a second phase of the software development cycle for the application as input to the second compliance agent to determine compliance or non-compliance of the second components according to a second set of policies as output from the second compliance agent, wherein the second set of policies is different than the first set of policies, and wherein the second machine learning generated model is trained based on the second set of policies; and a compliance analyzer, executing on the one or more processors, configured to determine a risk of the application across the software development cycle based on outputs from the two or more compliance agents, including the output from the first compliance agent and the output from the second compliance agent.

2. The system of claim 1, wherein to determine the risk of the application, the compliance analyzer is configured to determine a confidence score associated with the application based on the outputs from the two or more compliance agents.

3. The system of claim 2, wherein the confidence score is weighted based on first weights associated with non-compliance to one or more of the first set of policies and second weights associated with non-compliance to one or more of the second set of policies.

4. The system of claim 3, wherein the application is a first application of a plurality of applications, and wherein the compliance analyzer is configured to update a ranked list comprising the plurality of applications based on a weighted confidence score associated with the first application in relation to respective weighted confidence scores associated with the plurality of applications.

5. The system of claim 1, wherein the risk of the application is quantified as a confidence value, and wherein the compliance analyzer is configured to generate an alert when the confidence value is below a threshold value to identify when the application is a threat to a network environment.

6. The system of claim 1,
wherein in response to determining non-compliance of a first component according to at least one of the first set of policies, the first compliance agent is configured to generate a first report based on the at least one of the first set of policies; and
wherein in response to determining non-compliance of a second component according to at least one of the second set of policies, the second compliance agent is configured to generate a second report based on the at least one of the second set of policies.

7. The system of claim 1,
wherein the first compliance agent is configured to analyze source code in a source code repository associated with the application at the first phase of the software development cycle for the application to determine compliance or non-compliance of the source code according to the first set of policies;
wherein the second compliance agent is configured to analyze artifacts of deployed assets on a target deployment environment associated with the application at the second phase of the software development cycle for the application to determine compliance or non-compliance of the artifacts of deployed assets according to the second set of policies;
wherein the two or more compliance agents further comprising a third compliance agent configured to analyze access logs to the application at a third phase of the software development cycle for the application to determine compliance or non-compliance of the access logs according to a third set of policies.

8. The system of claim 1,
wherein the first components associated with the application comprise source code in a source code repository associated with the application, and the first set of policies comprises source code policies; and
wherein the first machine learning generated model of the first compliance agent includes one or more neural networks trained with training sets comprising a first group of source code policies from the first set of policies each paired with example source code that violated a corresponding source code policy of the first group of source code policies and a second group of source code policies from the first set of policies each paired with example source code that complied with a corresponding source code policy of the second group of source code policies.

9. The system of claim 1,
wherein the second components associated with the application comprise artifacts of deployed assets on a target deployment environment associated with the application, and the second set of policies comprises policies relating to accessing the deployed assets on the target deployment environment; and
wherein the second machine learning generated model of the second compliance agent includes one or more neural networks trained with training sets comprising a first group of policies from the second set of policies relating to accessing the deployed assets on the target deployment environment each paired with example artifacts of deployed assets that show violations of a paired policy of the first group of policies and a second group of policies from the second set of policies relating to accessing the deployed assets on the target deployment environment each paired with example artifacts of deployed assets that show compliance with a paired policy of the second group of policies.

10. The system of claim 1,
wherein the second components associated with the application comprise access logs to the application, and the second set of policies comprises access control policies; and
wherein the second machine learning generated model of the second compliance agent includes one or more neural networks trained with training sets comprising a first group of access control policies from the second set of policies each paired with example access logs that show violations of a paired policy of the first group of access control policies and a second group of access control policies from the second set of policies each paired with example access logs that show compliance with a paired policy of the second group of access control policies.

11. The system of claim 1,
wherein the first machine learning generated model is trained to identify patterns within the first components that are indicative of at least one of compliance or non-compliance with the first set of policies; and
wherein the second machine learning generated model is trained to identify patterns within the second components that are indicative of at least one of compliance or non-compliance with the second set of policies.

12. A method comprising:
analyzing, by a first compliance agent of two or more compliance agents, the first compliance agent comprising a first machine learning generated model executing on one or more processors, first components associated with an application at a first phase of a software development cycle for the application as input to the first compliance agent to determine compliance or non-compliance of the first components according to a first set of policies as output from the first compliance agent, wherein the first machine learning generated model is trained based on the first set of policies, analyzing, by a second compliance agent of the two or more compliance agents, the second compliance agent comprising a second machine learning generated model executing on the one or more processors, second components associated with the application at a second phase of the software development cycle for the application as input to the second compliance agent to determine compliance or non-compliance of the second components according to a second set of policies as output from the second compliance agent, wherein the second set of policies is different than the first set of policies, and wherein the second machine learning generated model is trained based on the second set of policies; and determining, by a compliance analyzer, a risk of the application across the software development cycle based on outputs from the two or more compliance agents, including the output from the first compliance agent and the output from the second compliance agent.

13. The method of claim 12, wherein determining the risk of the application includes determining a confidence score associated with the application based on the outputs from the two or more compliance agents.

14. The method of claim 13, wherein the confidence score is weighted based on first weights associated with non-compliance to one or more of the first set of policies and second weights associated with non-compliance to one or more of the second set of policies.

15. The method of claim 14, wherein the application is a first application of a plurality of applications, and wherein the method further comprises updating a ranked list comprising the plurality of applications based on a weighted confidence score associated with the first application in relation to respective weighted confidence scores associated with the plurality of applications.

16. The method of claim 12, wherein the risk of the application is quantified as a confidence value, and wherein the method further comprises generating, by the compliance analyzer, an alert when the confidence value is below a threshold value to identify when the application is a threat to a network environment.

17. The method of claim 12,
wherein in response to determining non-compliance of a first component according to at least one of the first set of policies, the method comprises generating, by the first compliance agent, a first report based on the at least one of the first set of policies; and
wherein in response to determining non-compliance of a second component according to at least one of the second set of policies, the method comprises generating, by the second compliance agent, a second report based on the at least one of the second set of policies.

18. The method of claim 12,
wherein analyzing the first components associated with the application comprises analyzing, by the first compliance agent, source code in a source code repository associated with the application at the first phase of the software development cycle for the application to determine compliance or non-compliance of the source code according to the first set of policies; and
wherein analyzing the second components associated with the application comprises analyzing, by the second compliance agent, artifacts of deployed assets on a target deployment environment associated with the application at the second phase of the software development cycle for the application to determine compliance or non-compliance of the artifacts of deployed assets according to the second set of policies,
the method further comprising analyzing, by a third compliance agent of the two or more compliance agents, access logs to the application at a third phase of the software development cycle for the application to determine compliance or non-compliance of the access logs according to a third set of policies.

19. The method of claim 12,
wherein the first machine learning generated model is trained to identify patterns within the first components that are indicative of at least one of compliance or non-compliance with the first set of policies; and
wherein the second machine learning generated model is trained to identify patterns within the second components that are indicative of at least one of compliance or non-compliance with the second set of policies.

20. A non-transitory computer readable medium comprising instructions that, when executed, cause one or more processors to:
analyze, by a first compliance agent of two or more compliance agents, the first compliance agent comprising a first machine learning generated model executing on the one or more processors, first components associated with an application at a first phase of a software development cycle for the application as input to the first compliance agent to determine compliance or non-compliance of the first components according to a first set of policies as output from the first compliance agent, wherein the first machine learning generated model is trained based on the first set of policies;
analyze, by a second compliance agent of the two or more compliance agents, the second compliance agent comprising a second machine learning generated model executing on the one or more processors, second components associated with the application at a second phase of the software development cycle for the application as input to the second compliance agent to determine compliance or non-compliance of the second components according to a second set of policies as output from the second compliance agent, wherein the second set of policies is different than the first set of policies, and wherein the second machine learning generated model is trained based on the second set of policies; and
determine, by a compliance analyzer, a risk of the application across the software development cycle based on outputs from the two or more compliance agents including the output from the first compliance agent and the output from the second compliance agent.

* * * * *